Patented Oct. 11, 1932

1,881,729

UNITED STATES PATENT OFFICE

HAROLD L. LEVIN, OF NUTLEY, NEW JERSEY, ASSIGNOR, BY MESNE ASSIGNMENTS, TO THE FLINTKOTE CORPORATION, OF BOSTON, MASSACHUSETTS, A CORPORATION OF MASSACHUSETTS

AQUEOUS DISPERSION AND PROCESS OF PRODUCING SAME

No Drawing.   Application filed December 2, 1927.   Serial No. 237,335.

This invention pertains to aqueous dispersions of substances normally immiscible with water, and to methods of producing the same, and particularly to those types of dispersions in which the said substance comprises the internal phase, the water being in the external or continuous phase.

One of the objects of the invention is to produce a bitumen-pitch type dispersion in which the dispersed particles shall be capable of remaining in suspension in the aqueous phase for a substantially indefinite period of time.

Another object is to produce dispersions of the type indicated which, when applied in the form of films, and the water content removed, will result in the formation of impervious or highly water-resistant films.

Another object is to produce dispersions of this character to which acids, acid salts, or the like may be added without causing any material amount of flocculation or otherwise perceptibly affecting the body of the dispersion or its ability to remain permanently in suspension.

A further object of the invention is to provide a dispersion of this type which shall be stable in the presence of electrolytes such as caustic alkali, ammonia, lime, etc., and shall also remain substantially unaffected in its stability by the addition of hydraulic cement, powdered pigments, mineral aggregate and the like.

Stated broadly, the invention comprises the use of carbohydric colloids such as dextrine, wheat flour, starch, or starch containing colloids, or the like, in the capacity of dispersing agents in the production of the dispersions, as hereinafter to be more fully described.

I have found that the above described objects may be achieved by employing starch, for example, as a dispersing agent under conditions to be hereinafter set forth. I am aware that it has been proposed to disperse bitumen by means of starch treated with alkali, but I have found that the dispersing action may be made easier and that better results in general may be had by using the starch untreated.

In carrying out the invention with this material, any of the various forms of starch, as for example potato starch, cornstarch or the like may be employed as the dispersing agent. The base dispersed may comprise any solid or semi-solid bitumen such as asphalt, either of the native or the artificially prepared variety, resins, pitches, rubber, or the like. Where the bitumen to be dispersed is normally solid or semi-solid, it is preferably heated so as to be brought to a fluid condition.

The temperature at which the bitumen may be maintained during the process of dispersion may vary over a considerable range, depending upon the character of bitumen. It is one of the advantages of the present invention, however, that careful control of the temperature during the dispersing action is not essential, as is the case with dispersions hitherto made with certain other types of dispersing agents. In fact, rather wide variations in the temperature of the batch being treated may be tolerated without materially affecting the operation or impairing in any way the character of the product resulting therefrom.

The starch selected as the dispersing agent may be conditioned by forming a swollen paste thereof in water. In one mode of carrying out the invention, for example, a corn starch may be made into a swollen paste with about 3.5 times its weight of boiling water. Obviously however, the concentration of the starch may vary over a considerable range, depending upon the thickness desired in the pasty mass.

In carrying out the invention in one of its forms, the aqueous starch paste as thus produced, may then be employed as the agent for assisting in the dispersion of the desired bitumen. The dispersing action may be carried out in any suitable form of agitating mechanism, adapted to cause rapid agitation of the mass contained therein, so as to effect a substantial subdivision of the bituminous material, the particles being thereby dispersed and maintained in suspension in the aqueous phase. For this purpose, the dispersing apparatus may be of a type provided with agitating propellers, or it may be of the colloid mill, or any other suitable type.

If desired, the dispersing apparatus may be provided with any suitable means, such as water jackets, or the like, for regulating the temperature of the mass being treated therein.

It is preferable, in conducting the process as a batch operation, to add the fluid bitumen to the starch paste and to continue the addition of bitumen during the agitation of the mass until the desired amount of bitumen has been dispersed as finely divided particles.

When using starch paste as the dispersing agent, as above described, the mass being subjected to the agitating action is preferably maintained in a paste condition but not so thick that dispersed particles may coalesce or assume a grainy texture, which detracts from the smoothness desired in the final product.

It is necessary when the process is carried out as a batch, in order to maintain the optimum viscosity, to add suitable quantities of water from time to time during the dispersing operation, but it should be understood that the water content should be kept as low as possible, consistent with the production of a dispersion which has a smooth, long, body and in which the particles dispersed are capable of remaining in suspension over long and indefinite periods.

In any event, however, the process is carried on in such manner that the bitumen is maintained as the dispersed phase throughout the dispersing action.

In a specific illustration of the invention and employing as the dispersing agent a starch paste made as above described, a dispersion of Mexican asphalt having a melting point of about 110 degrees to 130 degrees F., may be produced, in which the aqueous phase may comprise about 40% more or less, of the composition, the remaining 60% more or less being in the ratio of about 20 parts of the bitumen to 1 part of the starch used in the production of the dispersion.

The dispersion as thus produced is perfectly suspendable and on that account is particularly advantageous, especially where it is liable to remain quiescent for long periods of time before being put to use, as it is then unnecessary to vigorously stir or otherwise treat the product so as to bring into suspension such of the dispersed particles as may have settled to the bottom of the containing vessel.

Furthermore, the product as thus produced, may, under certain conditions of use, be treated with acids, alkalies or salts, and/or may be compounded with powdered pigments, mineral aggregate, hydraulic cement, or the like, without affecting to any perceptible degree, the suspendability of the dispersion, its characteristic long body, or any other of its essential properties. The stability of the dispersion as thus produced to the agencies and influences above mentioned, therefore constitutes another noteworthy advantage of the product.

Moreover, when the dispersion made as above described, is applied as a film or coating to a surface, the aqueous content thereof removed, and the dispersed bitumen particles have coalesced, a highly water-resistant protective film is formed which adheres very strongly to the surface and does not thereafter, upon subjecting the film to the action of water, reverse or re-disperse.

This film is further characterized by the slight tackiness of its surface, so that such a film would serve not only as a waterproofing medium, but would also be advantageous as an adhesive bonding coat for surfacings of various types that might be applied thereover.

While in the example above given, Mexican asphalt of 110 degrees to 130 degrees F. melting point is cited, it should be understood that this is merely a specific illustration and that the process is adaptable to the dispersion of asphalts of widely different characteristics, and in fact to bitumens and pitches of various types as hereinbefore enumerated.

Thus, the invention has been embodied in another illustrative run, in which an aqueous pasty mass of boiled potato starch was used as a dispersive media in effecting dispersion of a mixture of four parts of stearine pitch and one part of cumar resin, the final product being composed of the pitch-cumar in amounts approximating about five times by weight of the starch present therein.

Where it is desired to produce a dispersion of rubber, the starch in suitable quantities may be added in dry form to a mass of broken pieces of rubber, for instance, reclaimed rubber, and the mass milled in suitable apparatus and at elevated temperatures, if desired, until thorough incorporation has been effected, whereupon suitable quantities of water may be added to the mass, thereby forming the dispersion with the rubber in the internal phase and the water in the external phase thereof. It is understood, of course, that if desired the rubber can be dispersed by first plasticizing it and then agitating it in the presence of the colloid in paste form.

In place of starch, I may if desired, employ any form of dextrine as the dispersing agent. This material may likewise be made into an aqueous paste which may then be used in the same manner as the starch paste in dispersing bitumens or pitchy materials as above described.

One of the advantages of dispersions made as herein described, with starch or dextrinous material as the dispersing agent, is that by treating the said material or the finished dispersion containing the same, with enzymes, as for example diastase, a substantial part of the starch or dextrine in the finished dispersion may be transformed into maltose without affecting the stability of the dispersions.

Another advantage of dispersions made in accordance with the present invention, as distinguished from dispersions heretofore made with other types of dispersing agents, is that with the starchy colloids employed as herein described, it is possible to attain suspendable dispersions more readily without the necessity for obtaining fine particle size. The foregoing advantage may be due to the gelatinous nature of the starchy dispersive medium.

Where it is desired to prevent decomposition in the products made in accordance with the present invention, small amounts of a preservative such as formaldehyde, sodium benzoate or mercuric chloride or other suitable preservative may be added thereto.

Dispersions made as herein described, may be used in various capacities. Thus, where the proper type of base is dispersed with the carbohydric colloid of the present invention, the product may be adaptable as a road binder.

If desired, a dispersion may be made which can be combined with a cementitious material, mineral aggregate and fillers of various types to produce a mastic suitable for flooring and similar purposes.

Dispersions of this type may also be combined with fibrous and other fillers and molded in block or sheet form.

Where the base dispersed is a colorable pitch or resin, as in the example above given, wherein stearine pitch and cumar comprised the dispersed base, the finished dispersion may be used as a paint base and combined with any desired pigments, or if desired, the dispersion may be colored by means of soluble dyes.

Thus, for example, 100 parts more or less of the stearine pitch-cumar dispersion produced as above described, may be colored by adding thereto say 30 parts of a pigment such as red oxide of iron, and the paint thus produced may be thinned with water to the desired extent and applied either with a brush or by a spray. Such paint is particularly adaptable as a coating for surfaces having asphaltic constituents, since the paint contains no substance which is a solvent for asphalt.

Dispersions made in accordance with this invention, may also serve as protective coatings for surfaces of various types, and where it is desirable to unite to said surface another layer of material, the dispersion, by virtue of the tackiness of its dried film, may serve dually as a protective coating and as an adhesive bonding coat between the said layer and the surface to which it is applied.

The term bitumen-pitch as used in the specification and claims, is to be defined as embracing all of the materials discussed in the foregoing description.

By the expression "chemically unaltered" as included in the claims, I intend to define a colloid that has not been chemically treated.

I claim as my invention:

1. A stable, suspensible aqueous dispersion containing a bitumen-pitch type base consisting by weight, 35% to 40% of water, 55% to 60% of said base, and 2% to 5% of a starchy colloid in chemically unaltered state.

2. A stable, suspensible aqueous dispersion containing a bitumen-pitch type base consisting by weight 55% to 60% of said base in the dispersed phase, 2% to 5% of chemically unaltered starch, the balance being the aqueous medium.

In testimony whereof I affix my signature.

HAROLD L. LEVIN.